(12) United States Patent
Matsushima

(10) Patent No.: US 11,108,934 B2
(45) Date of Patent: Aug. 31, 2021

(54) INFORMATION PROCESSING APPARATUS AND INFORMATION PROCESSING METHOD FOR DETERMINING A PATCH CHART CONFIGURATION FOR DETERMINING A PATCH CHART CONFIGURATION

(71) Applicant: Yuki Matsushima, Kanagawa (JP)

(72) Inventor: Yuki Matsushima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/892,619

(22) Filed: Jun. 4, 2020

(65) Prior Publication Data

US 2021/0029270 A1    Jan. 28, 2021

(30) Foreign Application Priority Data

Jul. 23, 2019    (JP) .............................. JP2019-135622

(51) Int. Cl.
*H04N 1/60*      (2006.01)
*H04N 1/54*      (2006.01)
*H04N 1/00*      (2006.01)

(52) U.S. Cl.
CPC ....... *H04N 1/6033* (2013.01); *H04N 1/00034* (2013.01); *H04N 1/54* (2013.01); *H04N 1/60* (2013.01); *H04N 1/6008* (2013.01); *H04N 1/6061* (2013.01)

(58) Field of Classification Search
CPC combination set(s) only.
See application file for complete search history.

(56) References Cited

U.S. PATENT DOCUMENTS 10,291,826 B2 *    5/2019    Yoshida ............... H04N 1/6005

FOREIGN PATENT DOCUMENTS

| JP | 10-032724 | 2/1998 |
| JP | 2009-212839 | 9/2009 |
| JP | 2014-168140 | 9/2014 |
| JP | 2015-095737 | 5/2015 |
| JP | 2015-177380 | 10/2015 |
| JP | 2016-208492 | 12/2016 |
| JP | 2018-121308 | 8/2018 |

* cited by examiner

*Primary Examiner* — Barbara D Reinier
(74) *Attorney, Agent, or Firm* — IPUSA, PLLC

(57) ABSTRACT

An information processing apparatus includes circuitry configured to: receive designation of a particular color; obtain device values of a plurality of colors that are present within a predetermined distance or less from the designated particular color in a color space; and determine a patch configuration based on the device values. In determination the patch configuration, the circuitry is configured to determine a gradation change width of each color material based on a degree of change of a device value of each color material.

10 Claims, 17 Drawing Sheets

FIG. 6

EXAMPLE OF TARGET FILE

| COLOR NAME | Lab VALUE | | |
|---|---|---|---|
| PANTONE 7604 C | 86.51 | 5.73 | 2.54 |
| PANTONE 7615 C | 46.96 | 12.79 | 8.77 |
| PANTONE 4985 C | 39.98 | 26.7 | 8.46 |
| PANTONE 272 C | 51.48 | 14.96 | -40.7 |
| PANTONE 7669 C | 42.26 | 13.57 | -33.54 |
| PANTONE 5405 C | 46.86 | -8.72 | -17.06 |
| PANTONE 7733 C | 40.33 | -39.12 | 16.21 |
| PANTONE 620 C | 51.76 | -1.11 | 50.74 |
| PANTONE 7761 C | 47.07 | -4.69 | 32.54 |
| PANTONE 7767 C | 64.39 | -3.79 | 55.65 |
| PANTONE 475 C | 85.98 | 10.33 | 19.23 |
| PANTONE 4635 C | 46.33 | 19.54 | 32.72 |
| PANTONE 7539 C | 59.36 | -1.26 | 3.18 |
| PANTONE 429 C | 68.96 | -1.75 | -3.15 |
| PANTONE 422 C | 66.17 | -0.81 | -0.69 |
| PANTONE 445 C | 66.53 | -4.18 | -2.09 |

N NUMBER

EXAMPLE OF ADJUSTMENT FILE

| COLOR NAME | CMYKOrGr VALUE | | | | | |
|---|---|---|---|---|---|---|
| PANTONE 7604 C | 1.2 | 2.46 | 0.39 | 1.2 | 2.36 | 0 |
| PANTONE 7615 C | 13.3 | 15.52 | 13.86 | 5 | 15.58 | 0 |
| PANTONE 4985 C | 15.36 | 30.57 | 16.15 | 0 | 21.86 | 0 |
| PANTONE 272 C | 18.17 | 25.95 | 0.13 | 0 | 0 | 0 |
| PANTONE 7669 C | 19.86 | 30.83 | 4.08 | 4.08 | 0 | 0 |
| PANTONE 5405 C | 20.03 | 13.81 | 8.93 | 8.93 | 0 | 0 |
| PANTONE 7733 C | 9.43 | 11.16 | 28.35 | 11.16 | 0 | 49.95 |
| PANTONE 620 C | 8.7 | 7.95 | 79.08 | 8.47 | 7.2 | 0 |
| PANTONE 7761 C | 11.45 | 10.85 | 46.51 | 9.84 | 5.89 | 0 |
| PANTONE 7767 C | 5.81 | 5.53 | 53.88 | 5.38 | 4.27 | 0 |
| PANTONE 475 C | 0.7 | 0.28 | 4.52 | 0.46 | 7.32 | 0 |
| PANTONE 4635 C | 14.05 | 14.3 | 30.77 | 0 | 27.77 | 0 |
| PANTONE 7539 C | 8.39 | 7.14 | 11.17 | 8.39 | 2.37 | 0 |
| PANTONE 429 C | 6.46 | 6.14 | 4.55 | 5.96 | 0 | 1.97 |
| PANTONE 422 C | 6.6 | 5.42 | 7.12 | 6.66 | 1.71 | 0.99 |
| PANTONE 445 C | 16.64 | 17.02 | 17.38 | 16.48 | 0.98 | 0.35 |

N NUMBER

FIG. 8

| Label | | | | | | |
|---|---|---|---|---|---|---|
| NUMBER OF PATCHES FOR FIRST ADJUSTMENT TARGET COLOR | 120 | | | | | |
| DEVICE VALUES OF PATCHES (ORDER OF CMYKOrGr) 120 LINES | 1.57 | 0.39 | 25.25 | 1.16 | 2.12 | 0 |
| | 1.57 | 0.39 | 25.25 | 1.16 | 4.7867 | 0 |
| | 1.57 | 0.39 | 25.25 | 1.16 | 7.4533 | 0 |
| | 1.57 | 0.39 | 25.25 | 1.16 | 10.12 | 0 |
| | 1.57 | 0.39 | 27.75 | 1.16 | 2.12 | 0 |
| | : | | | | | |
| | 4.57 | 2.39 | 32.75 | 1.16 | 10.12 | 0 |
| | 4.57 | 2.39 | 35.25 | 1.16 | 2.12 | 0 |
| | 4.57 | 2.39 | 35.25 | 1.16 | 4.7867 | 0 |
| | 4.57 | 2.39 | 35.25 | 1.16 | 7.4533 | 0 |
| | 4.57 | 2.39 | 35.25 | 1.16 | 10.12 | 0 |
| NUMBER OF PATCHES FOR SECOND ADJUSTMENT TARGET COLOR | 160 | | | | | |
| DEVICE VALUES OF PATCHES (ORDER OF CMYKOrGr) 160 LINES | 0 | 0 | 33.64 | 0.32 | 5.58 | 0 |
| | 0 | 0 | 33.64 | 0.32 | 8.2467 | 0 |
| | 0 | 0 | 33.64 | 0.32 | 10.913 | 0 |
| | 0 | 0 | 33.64 | 0.32 | 13.58 | 0 |
| | 0 | 0 | 33.14 | 0.32 | 5.58 | 0 |
| | : | | | | | |
| | 9.66 | 11.8 | 11.08 | 2.46 | 65.49 | 0 |
| | 9.66 | 11.8 | 11.08 | 2.46 | 67.99 | 0 |
| | 9.66 | 11.8 | 11.08 | 2.46 | 70.49 | 0 |
| | 9.66 | 11.8 | 11.08 | 2.46 | 72.99 | 0 |
| | 9.66 | 11.8 | 11.08 | 2.46 | 75.49 | 0 |
| NUMBER OF PATCHES FOR SECOND ADJUSTMENT TARGET COLOR | 85 | | | | | |
| DEVICE VALUES OF PATCHES (ORDER OF CMYKOrGr) 85 LINES | 0 | 0 | 0 | 0 | 3.63 | 0 |
| | 0 | 0 | 0 | 1.79 | 3.63 | 0 |
| | 0 | 0 | 0 | 3.58 | 3.63 | 0 |
| | 0 | 0 | 0 | 5.37 | 3.63 | 0 |
| | 0 | 0 | 1.52 | 0 | 3.63 | 0 |
| | : | | | | | |
| | 8.63 | 24.21 | 0 | 1 | 0 | 0 |
| | 8.63 | 24.21 | 1.5 | 0 | 0 | 0 |
| | 8.63 | 24.21 | 1.5 | 1 | 0 | 0 |
| | 8.63 | 24.21 | 3 | 0 | 0 | 0 |
| | 8.63 | 24.21 | 3 | 1 | 0 | 0 |

CHART DATA SPECIFICATION

FIG. 12

CENTRAL DEVICE VALUE: $C_0$ $C_0-(10/2)$  $C_0$  $C_0+(10/2)$

AMPLITUDE VALUE (EXAMPLE OF CYAN)
WHEN
INITIAL DEVICE VALUE: $C_0$
NUMBER OF DIVISIONS: 5
AMPLITUDE WIDTH: 10

WHEN THE NUMBER OF DIVISIONS IS FIVE 1  2  3  4  5 (=dc)

NUMBER OF DIVISIONS

WHEN $C_0-(w_0/2)<0$

FIVE DIVISIONS $C_0-(10/2)$  0  $C_0$  $C_0+(10/2)$

WHEN $100<C_0+(w_0/2)$

FIVE DIVISIONS $C_0-(10/2)$  $C_0$ 100  $C_0+(10/2)$

INFORMATION PROCESSING APPARATUS AND INFORMATION PROCESSING METHOD FOR DETERMINING A PATCH CHART CONFIGURATION FOR DETERMINING A PATCH CHART CONFIGURATION

CROSS-REFERENCE TO RELATED APPLICATION

This patent application is based on and claims priority pursuant to 35 U.S.C. § 119(a) to Japanese Patent Application No. 2019-135622, filed on Jul. 23, 2019, in the Japan Patent Office, the entire disclosure of which is hereby incorporated by reference herein.

BACKGROUND

Technical Field

The present disclosure relates to an information processing apparatus and an information processing method, for generating image data for printing a chart constituted as a plurality of color patches on a sheet for color adjustment.

Description of the Related Art

Remarkable progress of inkjet technology in recent years implements an inkjet printer capable of performing colored large-format printing with high speed and high image quality. Such printer is used in a wide range of fields, not only for personal and home use, but also recently for commercial use in particular.

To meet various commercial demands, various kinds of printing medium (paper) are used. Further, since there is a demand that advertisement printing stimulates consumers' appetite through their visual sense, the quality of color of printed matter (a printing medium on which an image is formed) is particularly critical. In addition to the conventional "process color printer" consisting of process colors such as cyan, magenta, yellow, and black inks, a "multicolor printer" including inks of intermediate hues of the process colors, such as red, green, and blue are coming along. The multicolor printer implements printing of higher saturation and wider color gamut than the process color printer.

As a color management process of a printed matter, various color matching techniques such as a method for creating an ICC (International Color Consortium) profile and a method for adjusting colors have been disclosed. These color matching techniques are applicable to not only inkjet printers but also digital printers including electrophotographic printers and thermal-type printers, and peripheral devices thereof.

A technique called "spot color conversion" is known as a method for reproducing a target color. FIG. 1 is a diagram illustrating a process of the spot color conversion. The spot color conversion is a process of performing a first spot color conversion 103 on an input image 101 configured and specified by a spot color name by using a spot color dictionary 102 describing color information corresponding to the spot color name, to obtain a print image configured by device values. The spot color dictionary describes Lab values corresponding to color names. The color conversion is performed on the Lab value as an input value by using an output profile 104, to obtain device values 105 of a printer 106 to be used.

However, even if the output profile is properly adjusted in the initial state, any change in the printer due to environmental changes or other factors may result in that the print output deviates from the target Lab values.

Further, the profile used for the spot color conversion is typically generated by outputting a patch chart constituted by a plurality of colors preset by a profile builder and measuring the output patch chart. The profile generated thus has consistency overall. In other words, such profile is not optimized for a particular target color.

To address this issue, a method is proposed for adjusting color when the accuracy of an output profile is poor, when the Lab values of a target color cannot be obtained from the adjusted output profile due to variations in the state of the printer. Specifically, in the above method, in order to keep the target color within a range of a close color, a profile conversion is performed with the Lab values of the target color as an input value, to obtain device values. Further, a patch group including a plurality of patches is generated, each patch being obtained changing stepwise the gradation levels of the obtained device values.

However, when a patch group for color adjustment is generated by changing the device values as described above, the number of patches for adjustment increases by the power of the number of inks. For example, if the device values are changed in five levels for one color of ink, the number of patches is $5^4=625$, when the number of inks is four. However, the number of patches is $5^6=15625$, when the number of inks is six, which is 25 times compared with when the number of inks is four.

SUMMARY

According to one or more embodiments, an information processing apparatus includes circuitry configured to: receive designation of a particular color; obtain device values of a plurality of colors that are present within a predetermined distance or less from the designated particular color in a color space; and determine a patch configuration based on the device values. In determination the patch configuration, the circuitry is configured to determine a gradation change width of each color material based on a degree of change of a device value of each color material.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating files, according to an embodiment of the present disclosure;

FIG. 8 is an illustration of an example of a specification of chart data, according to an embodiment of the present disclosure;

FIG. 12 is an illustration for describing device values of cyan for patches, according to an embodiment of the present disclosure;

Figure 1:
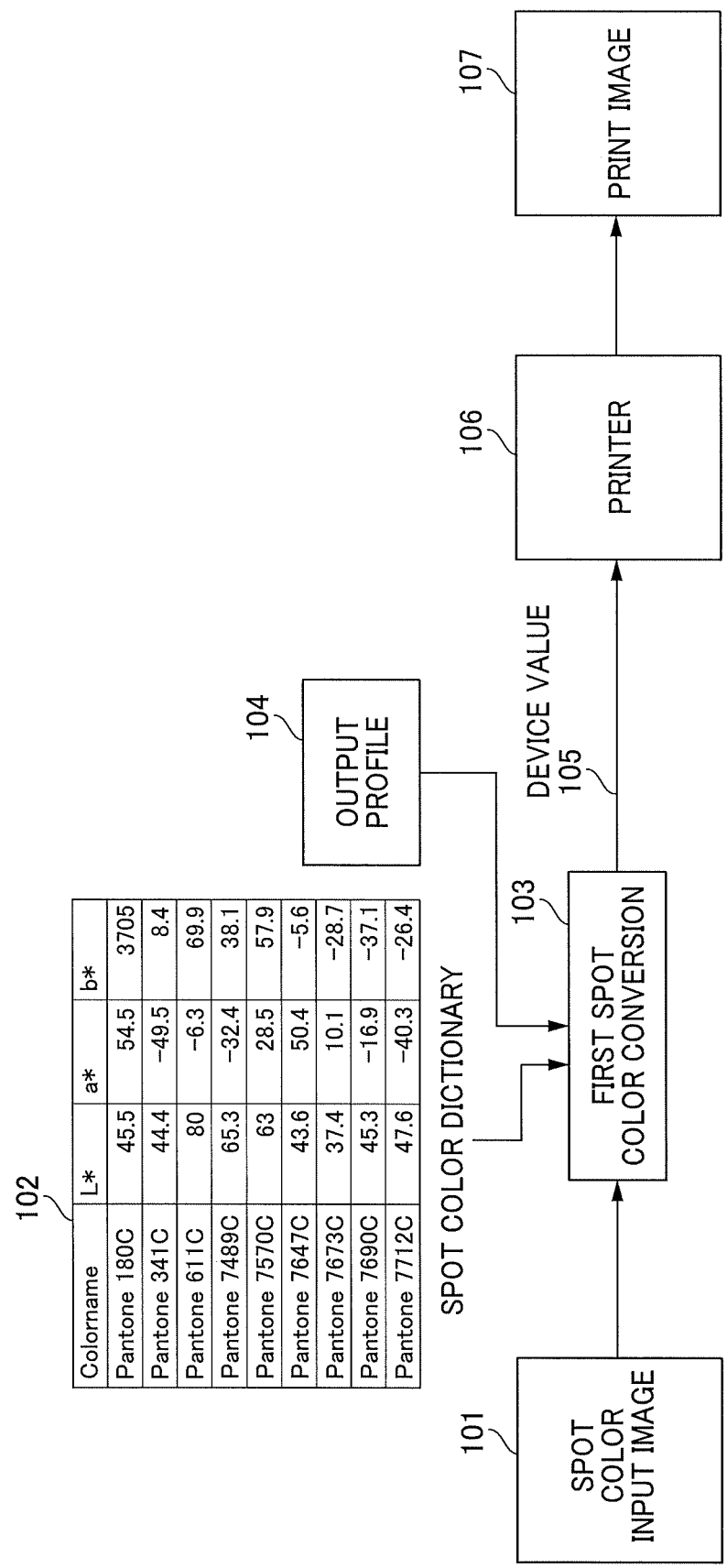
FIG. 1 is a diagram illustrating a general spot color conversion, according to background art.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure is described.

Terms in the Disclosure:

The following is the description of terms used in the disclosure.

(1) Spot Color

The term "spot color" refers to a color specified in color books or color chips defined by Pantone, DIC, TOYO, etc. The spot color is specified by a number such as "DIC XX".

(2) Process Color

The term "process color" collectively refers to cyan, magenta, yellow, and black (=CMYK), which are the basic colors of printing.

(3) Multi-Color

The term "multi-color" refers to a configuration obtained by adding a different color (s) to CMYK to expand the color reproduction range.

(4) Intermediate Hue Ink

The term "intermediate hue ink" collectively refers to an ink(s) used in the multi-color, other than the process color.

Although in embodiments of the present disclosure, an example in which an image forming apparatus is an inkjet image forming apparatus is described, the embodiments are not limited thereto. For example, the image forming apparatus can be an electrophotographic image forming apparatus. Further, the ink of each color is an example of color material. The color material may include a toner.

First Embodiment

Overview:

FIG. 1 is a diagram illustrating a general spot color conversion. In FIG. 1, a controller stores a spot color dictionary including a pair of a color name and a corresponding Lab value, and performs absolute color conversion based on an output profile depending on a type of sheet.

Figure 2:
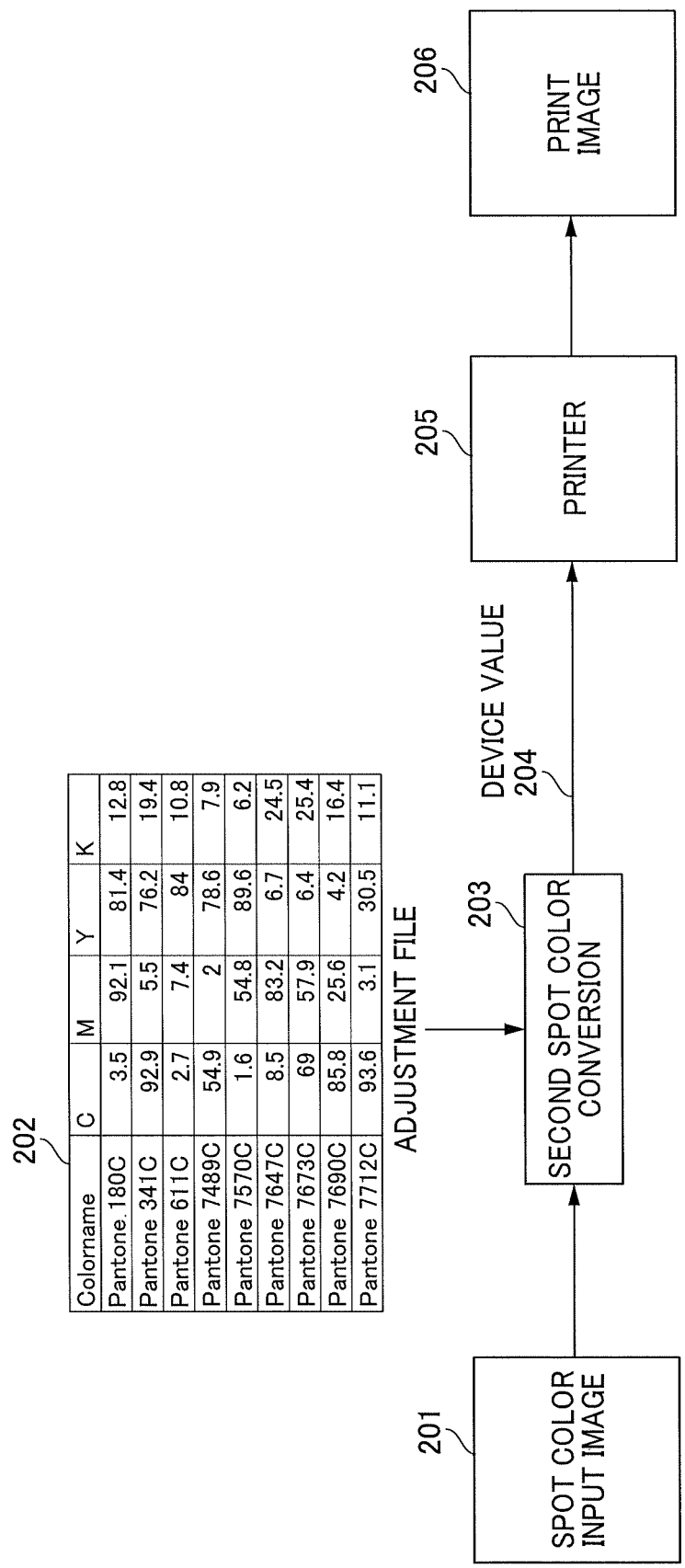
FIG. 2 is a diagram illustrating spot color adjustment, according to an embodiment of the present disclosure.

FIG. 2 is a diagram illustrating spot color adjustment according to an embodiment of the present disclosure. In the present disclosure, a chart is generated when the print image 107 obtained by the first spot color conversion 103 fails to present highly precise color reproduction. The generated chart is printed out and colorimetry are performed on the printed chart, and an adjustment file 202 associating a color name with device values are generated. A second spot color conversion 203, which is a process of directly obtaining device values for an adjustment target color, are performed by using the generated adjustment file 202, whereby a print image 206 with highly precise color reproduction is obtained. In the following, the second spot color conversion 203 is simply referred to as "spot color conversion".

Figure 3:
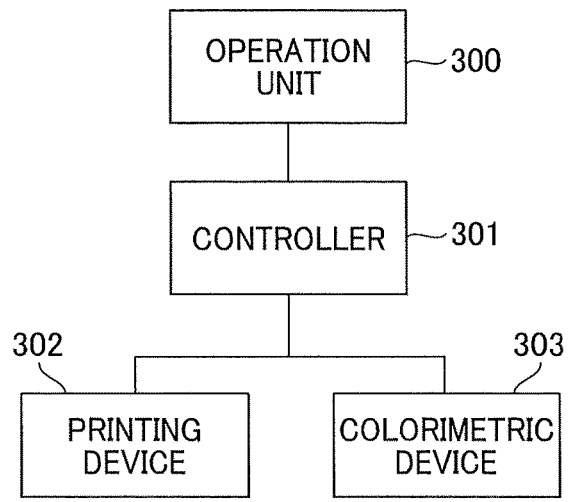
FIG. 3 is a diagram illustrating an example of a functional configuration, according to an embodiment of the present disclosure.
Figure 4:
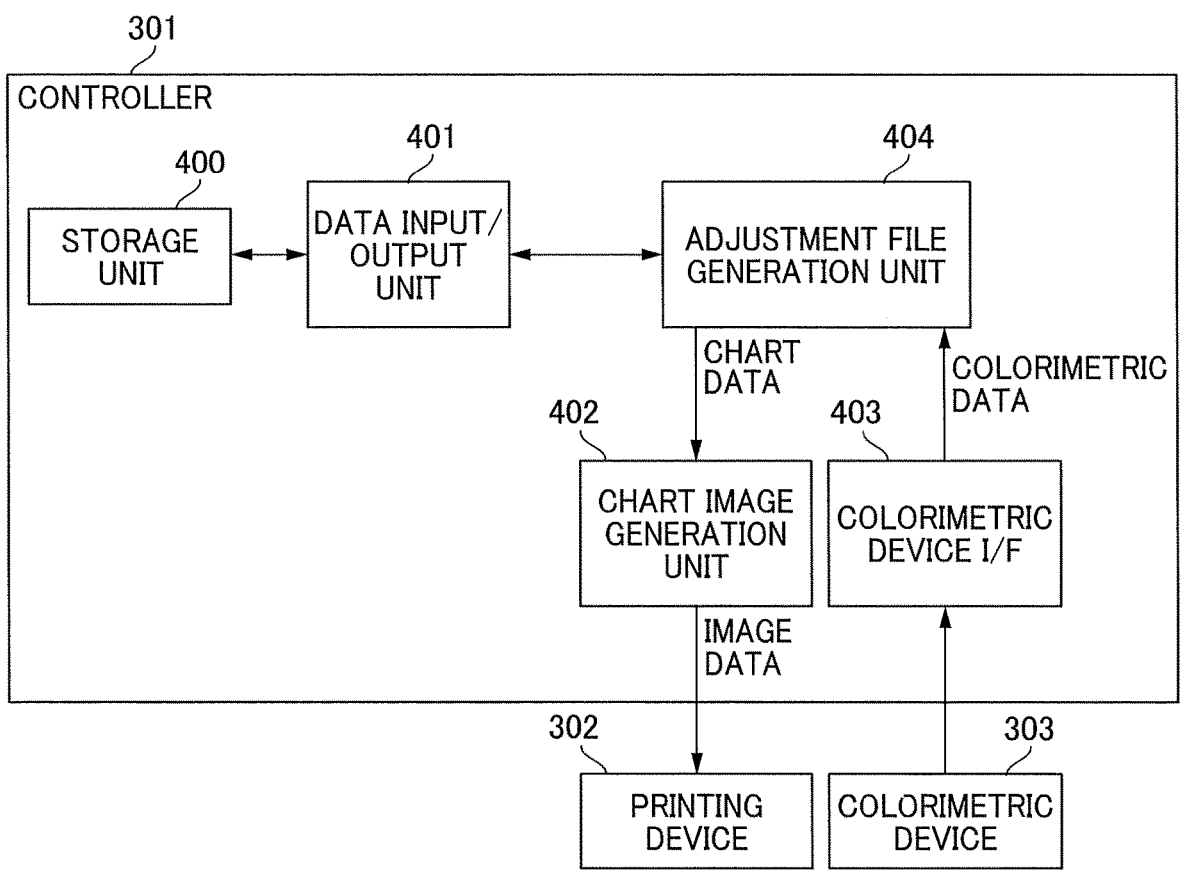
FIG. 4 is a diagram illustrating an example of a functional configuration, according to an embodiment of the present disclosure.
Figure 5:
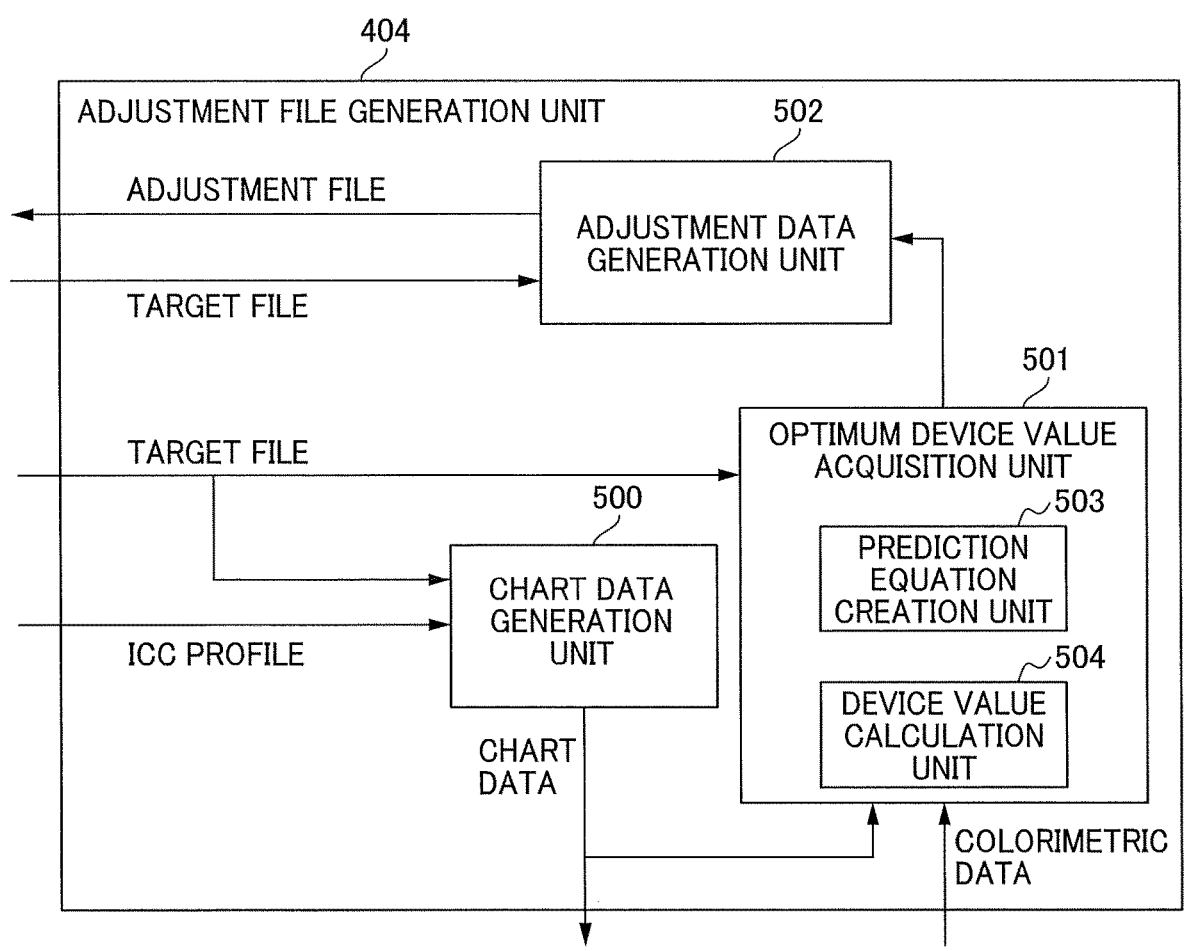
FIG. 5 is a diagram illustrating an example of a functional configuration, according to an embodiment of the present disclosure.

Functional Configuration:

FIGS. 3, 4, and 5 are diagrams, each illustrating an example of a functional configuration according to an embodiment of the present disclosure. As illustrated in FIG. 3, a system according to one embodiment of the present disclosure includes an operation unit 300, a controller 301, a printing device 302, and a colorimetric device 303. The operation unit 300 receives a user instruction via a keyboard, a mouse, a display, and the like, and displays a status. The controller 301 generates chart image data based on an adjustment target color of the spot color designated by a user, instructs printing, color measurement, and the like, and generates an adjustment file 202. The printing device 302 receives an instruction from the controller 301 and prints an image. The colorimetric device 303 measures the color of the printed image.

FIG. 4 is a diagram illustrating a functional configuration of the controller 301. As illustrated in FIG. 4, the controller 301 includes a storage unit 400, a data input/output unit 401, a chart image generation unit 402, a colorimetric device interface (I/F) 403, and an adjustment file generation unit 404.

The storage unit 400 stores an ICC profile and a target file described below. The ICC profile and the target file stored in the storage unit 400 are transmitted to the adjustment file generation unit 404 via the data input/output unit 401. The storage unit 400 receives the adjustment file for spot colors generated by the adjustment file generation unit 404 via the data input/output unit 401. The target file describes information on the adjustment target color. A detailed description is given later of the specification details of the target file. The adjustment target color is designated by the user via the operation unit 300, and whereby the target file is generated.

The chart image generation unit 402 receives the chart data transmitted by the adjustment file generation unit 404, generates image data in a portable document format (PDF) or the like, and transmits the generated image data to the printing device 302.

The colorimetric device I/F 403 is a module that interfaces with the colorimetric device 303, and receives the Lab value output from the colorimetric device 303.

The adjustment file generation unit 404 receives the target file and the ICC profile from the storage unit 400 via the data input/output unit 401. Further, the adjustment file generation unit 404 generates chart data and transmits the chart data to the chart image generation unit 402. Furthermore, the adjustment file generation unit 404 receives colorimetric data via the colorimetric device I/F 403, and generates a spot color adjustment file used for printing the adjustment target color with the same Lab value as the target color. The adjustment file generation unit 404 stores the generated spot color adjustment file in the storage unit 400 via the data input/output unit 401.

File Specifications:

FIG. 6 is an illustration of the following files. Target File: The target file includes one or more lines, each describing a color name defined by the spot color and the Lab values in real numbers. The target file describes information on adjustment target colors.

Adjustment File:

The adjustment file includes one or more lines, each describing a color name defined by the spot color and the ink device values in real numbers. The adjustment file describes only information on the adjustment target colors.

The description is given of an example in which the number of adjustment target color is N. Accordingly, each of the target file and the spot color adjustment file include N lines.

In the description of the present embodiment, the printing device 302 has a configuration of six color inks of cyan, magenta, yellow, black, orange, and green. In other words, the intermediate hue inks in this embodiment are orange and green. In the following description, the six colors of cyan, magenta, yellow, black, orange, and green are represented by C, M, Y, Or, and Gr, respectively.

FIG. 5 is a diagram illustrating a functional configuration of the adjustment file generation unit 404. As illustrated in FIG. 5, the adjustment file generation unit 404 includes a chart data generation unit 500, an optimum device value acquisition unit 501, and the adjustment data generation unit 502.

The chart data generation unit 500 receives the ICC profile and the target file, determines, for each adjustment target color, the device value of each patch of a patch group constituting a chart. The chart data generation unit 500 writes the determined device value of each patch as chart data.

The optimum device value acquisition unit 501 includes a prediction equation creation unit 503 and a device value calculation unit 504. The optimum device value acquisition unit 501 creates a prediction equation, and acquires an output device value for reproducing the target Lab value using the created prediction equation. Specifically, the prediction equation creation unit 503 creates, for each ink color, a linear model prediction formula using the colorimetric Lab values in colorimetric data and the device values in the print chart data. In the prediction equation, the Lab values are an input and the device values are an output. The device value calculation unit 504 calculates an optimum output device values for reproducing the target Lab values of the adjustment target color using the generated prediction equation.

Figure 7:
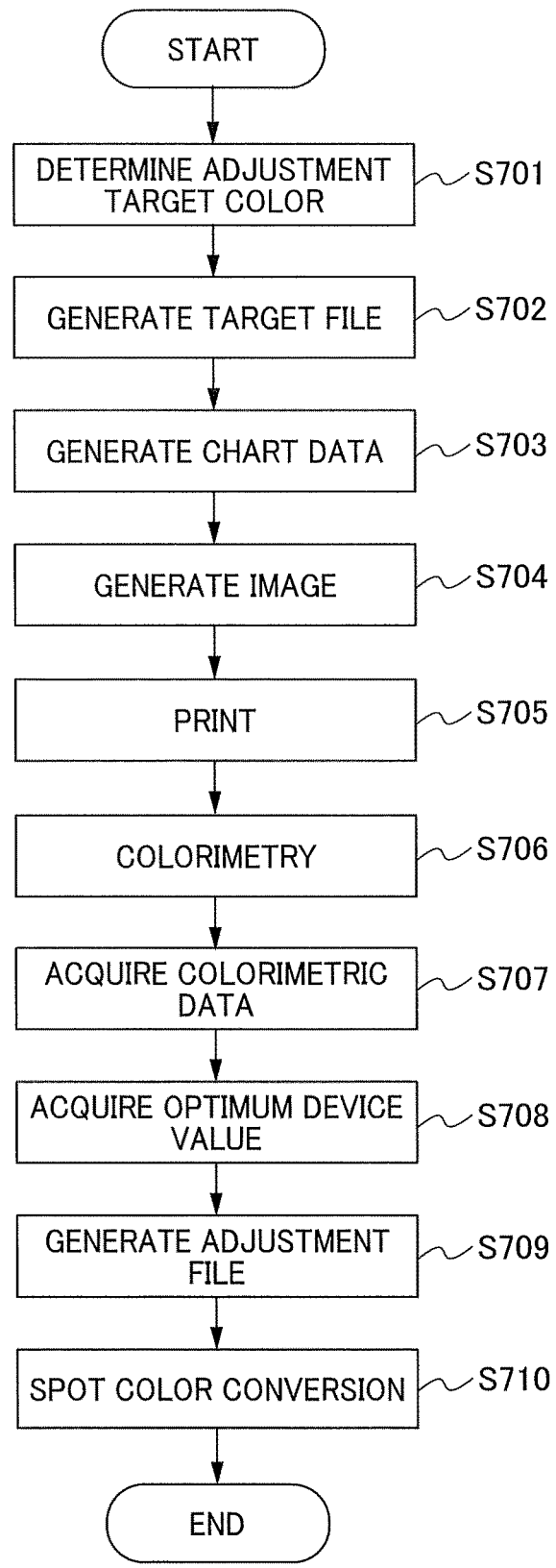
FIG. 7 is a flowchart illustrating an example of steps in a spot color adjustment process, according to an embodiment of the present disclosure.

Overview of Process:

FIG. 7 is a diagram illustrating an example of steps in a spot color adjustment process according to the present embodiment.

First, in response to a user's operation of setting the adjustment target color through the operation unit 300 (S701), the controller 301 generates a target file and stores the generated target file in the storage unit 400 (S702). Next, the adjustment file generation unit 404 generates chart data (S703). The chart data is constituted as a group of color patches. A detailed description is given later of the chart data. Next, the chart image generation unit 402 performs a process of generating an image having a patch configuration based on the number of patches and the device value of each patch described in the generated chart data. For example, the chart image generation unit 402 converts the chart data into PDF format image data (S704). The printing device 302 performs printing based on the image data obtained by the conversion (S705). The colorimetric device 303 measures the printed image (S706). The colorimetric data is read into the adjustment file generation unit 404 via the colorimetric device I/F 403 (S707). The adjustment file generation unit 404 calculates an optimum device value for each adjustment target color (S708), and generates a spot color adjustment file describing the color name of each adjustment target color and the device value obtained in S708 (S709). The controller 301 performs the spot color conversion illustrated in FIG. 2 (S710), and the process ends.

A description is now given of the details of steps S703 and S708.

Chart Data Generation Process (S703):

FIG. 8 is an illustration of an example of the specification of chart data according to an embodiment of the present disclosure. The chart data includes (X+1) rows for one adjustment target color. The number of patches X is described in the first line, and the device value is described in each line from the second line to (X+1) th lines. When the number of adjustment target colors is plural (e.g., three), the chart data has a configuration in which the combination of the number of patches and the device value group are repeated for each color.

Figure 9:
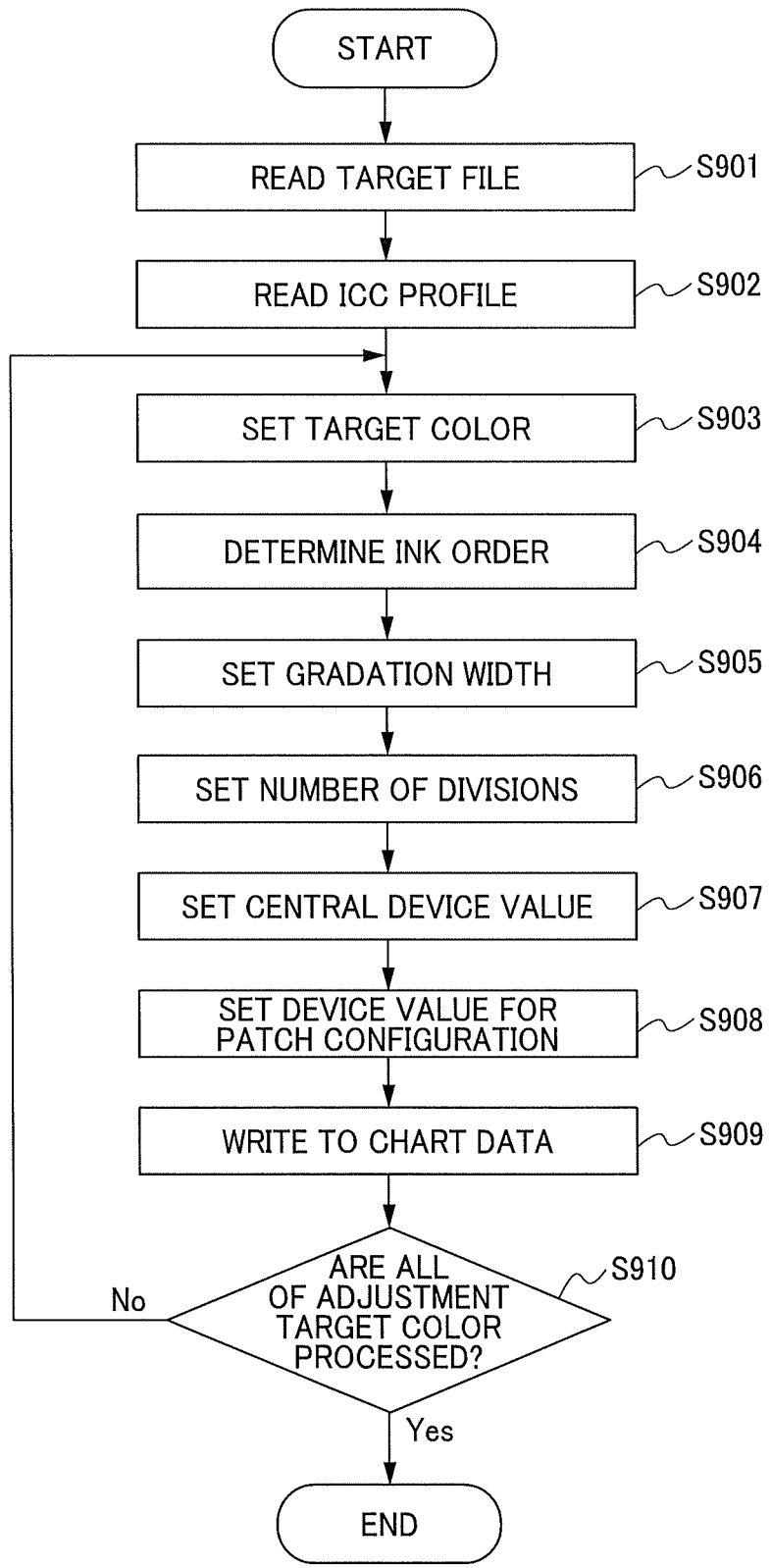
FIG. 9 is a flowchart illustrating an example of steps in a chart data generation process, according to an embodiment of the present disclosure.

Next, a description is given of a chart data generation process according to the present embodiment with reference to the flowchart of FIG. 9. Specifically, FIG. 9 is a flowchart illustrating a process of determining device values of the color patch group constituting a chart generated by the chart data generation unit 500.

First, in step S901, the adjustment file generation unit 404 reads a target file from the storage unit 400 via the data input/output unit 401, and acquires the color names and Lab values of each adjustment target color for N rows and 4 columns. The data is arranged in order of color name, L, a, and b. Next, the adjustment file generation unit 404 reads the ICC profile from the storage unit 400 via the data input/output unit 401 (S902). Next, the adjustment file generation unit 404 selects one color from the adjustment target colors and sets the selected color to a target color (S903). Next, the adjustment file generation unit 404 determines an ink order (S904). The ink order is used for setting a gradation width and setting the number of divisions in subsequent steps. Next, the adjustment file generation unit 404 sets a gradation width for each ink color (S905). Next, the adjustment file generation unit 404 sets the number of divisions for each ink (S906). Next, the adjustment file generation unit 404 sets a central device value, which is the center of the gradation change (S907), and calculates the device value for the patch configuration (S908). The adjustment file generation unit 404 writes the number of patches and the device value of each patch to the chart data (S909).

The adjustment file generation unit 404 performs the steps from S903 to S909 on all of the adjustment target colors (S910). Then, the process ends.

A description is now given of the details of each of steps S903 to S908. In the following description, the device value is expressed in a percentage from 0 to 100, instead of 8 bits from 0 to 255.

Setting of Target Color (S903):

The adjustment file generation unit 404 reads one line from the target file, and sets the color name in the line to a "target color" and the Lab value in the line to a "target Lab value".

Setting of Ink Order (S904):

In the ink order setting process, the adjustment file generation unit 404 ranks the six ink colors. Of the six ink colors, four ink colors that are ranked in first to fourth places are ink colors on which the gradation change process is to be performed in the subsequent step.

Figure 10:
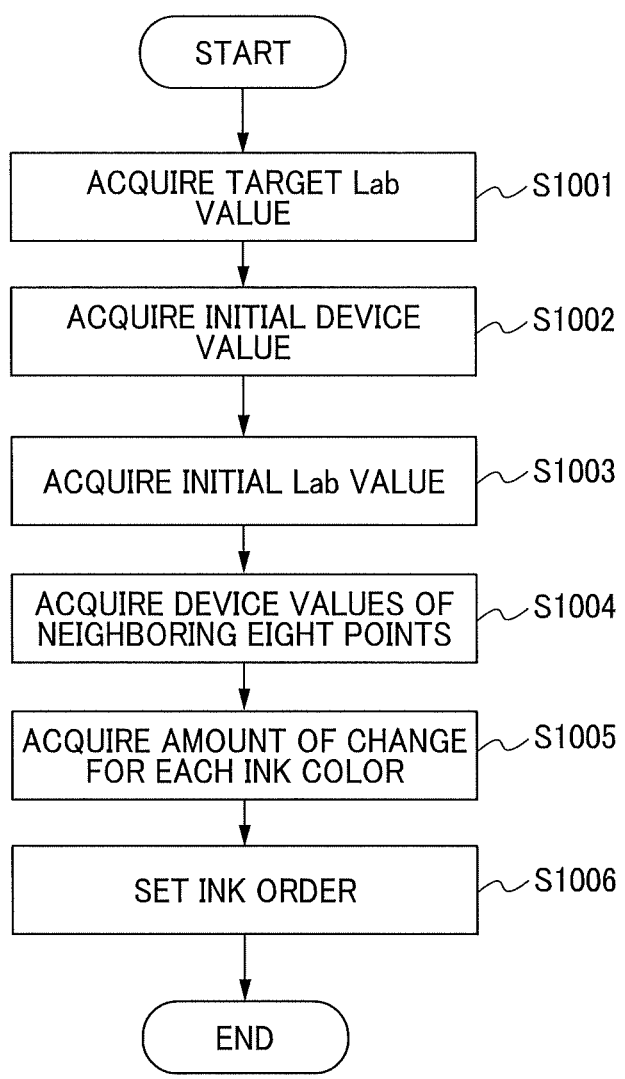
FIG. 10 is a flowchart illustrating an example of steps in an ink order setting process, according to an embodiment of the present disclosure.

FIG. 10 is a flowchart illustrating the ink order setting process according to an embodiment of the present disclosure.

As preprocessing of setting the ink order, the adjustment file generation unit 404 calculates the amount of change in the device values of eight points near the target in the Lab space. First, the adjustment file generation unit 404 acquires a target Lab value (S1001). Next, the adjustment file generation unit 404 performs BtoA absolute color conversion (conversion from the Lab value to CMYKOrGr value) using the ICC profile with the target Lab value as an input value, to obtain an initial device value (C0, M0, Y0, K0, Or0, Gr0) (S1002). Next, the adjustment file generation unit 404 performs AtoB absolute color conversion (conversion from the CMYKOrGr value to the Lab value) using the ICC profile with the initial device value as an input value, to acquire a Lab value (L0, a0, b0). This value is a value that predicts a reproduced color when printed by a target device, and is referred to as an "initial Lab value" (S1003).

Figure 11:
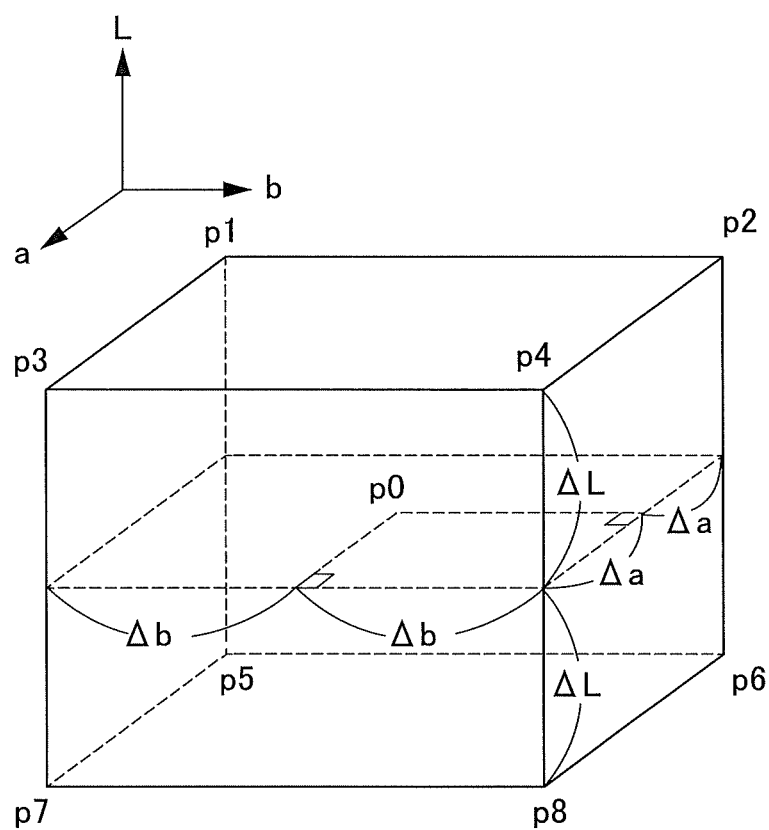
FIG. 11 is an illustration for describing the concept of eight points near an initial Lab value in a color space, according to an embodiment of the present disclosure.

Next, eight points near the initial Lab value in the color space are set. FIG. 11 is an illustration for describing the eight points near the initial Lab value. As illustrated in FIG. 11, eight points pi (i=1 to 8) are obtained by shifting the coordinate point p0 of the initial Lab value by ΔL, Δa, and Δb (an example of a predetermined distance in the color space) to each side along the L-axis, a-axis, and b-axis respectively. In the embodiment, the Lab value at the coordinate point pi is represented by (Li, ai, bi). Next, the adjustment file generation unit 404 performs the BtoA absolute color conversion (conversion from the Lab value to the CMYKOrGr value) using an ICC profile with the Lab value (Li, ai, bi) of the coordinate point pi as an input value, to obtain a device value (Ci, Mi, Yi, Ki, Ori, Gri) (S1004).

Next, the adjustment file generation unit 404 calculates the difference between the maximum value and the minimum value of the obtained device values of the eight points for each ink, to obtain the change amounts (δC, δM, δY, δK, δOr, δGr) (S1005). Equation 1 indicates an equation for obtaining the change amounts of cyan as an example.

$$\delta C = \text{Max}(C_i) - \text{Min}(C_i) \quad i=1,2,\ldots 8 \qquad \text{[Equation 1]}$$

Next, the adjustment file generation unit 404 ranks the ink colors in descending order of the change amount (S1006). Then, the process ends.

Setting of Gradation Width (S905):

The adjustment file generation unit 404 sets the gradation width according to the order of the ink colors. Table 1 indicates a specific example. Table 1 describes the gradation width for each rank. The value of gradation width is set according to the rank of the corresponding ink color. In this example, the values of the gradation width for the ink colors that are ranked in the fifth and sixth places are 0. This means that the gradation does not substantially change in the ink colors ranked in the fifth and sixth places.

TABLE 1

| Ink Order | 1 | 2 | 3 | 4 | 5 | 6 |
|---|---|---|---|---|---|---|
| Gradation Width | 20 | 18 | 10 | 5 | 0 | 0 |

Setting of the Number of Divisions (S906):

The adjustment file generation unit 404 sets the number of divisions according to the order of the ink colors. Table 2 indicates a specific example. Table 2 describes the number of divisions for each rank. The value of the number of divisions is set according to the rank of the corresponding ink color. In this example, the values of the number of divisions for the ink colors in the fifth and sixth places are 1. This means that division is not performed on the ink colors in fifth and sixth places.

TABLE 2

| Ink Order | 1 | 2 | 3 | 4 | 5 | 6 |
|---|---|---|---|---|---|---|
| Number of Divisions | 5 | 4 | 3 | 2 | 1 | 1 |

Setting of Central Device Value (S907):

The central device value is a value that functions as the center of the gradation values. The adjustment file generation unit 404 sets the initial device values (C0, M0, Y0, K0, Or0, Gr0) acquired in S1002 as the central device value.

Obtaining Device Value for Patch Configuration (S908):

FIG. 12 is an illustration for describing the device values of cyan for patches to be obtained. In the example of FIG. 12, the gradation width (wc) is 10, and the number of divisions (dc) is 5. The device values of cyan are obtained by dividing C0−(10/2) to C0+(10/2) into five levels. However, when C0−(wc/2)<0, the device values of cyan are obtained by dividing 0 to C0+(wc/2) into five levels. When C0−(wc/2)<100, the device values of cyan are obtained by dividing C0−(wc/2) to 100 into five levels. Table 3 indicates the representation of "central device value", "number of divisions", and "gradation width" for each ink color.

TABLE 3

| Central Device Value | $C_0$ | $M_0$ | $Y_0$ | $K_0$ | $Or_0$ | $Gr_0$ |
|---|---|---|---|---|---|---|
| Number of Divisions | $d_c$ | $d_m$ | $d_y$ | $d_k$ | $d_{or}$ | $d_{gr}$ |
| Gradation Width | $w_c$ | $w_m$ | $w_y$ | $w_k$ | $w_{or}$ | $w_{gr}$ |
| Increment Variable | $i_c$ | $i_m$ | $i_y$ | $i_k$ | $i_{or}$ | $i_{gr}$ |

Figure 13:
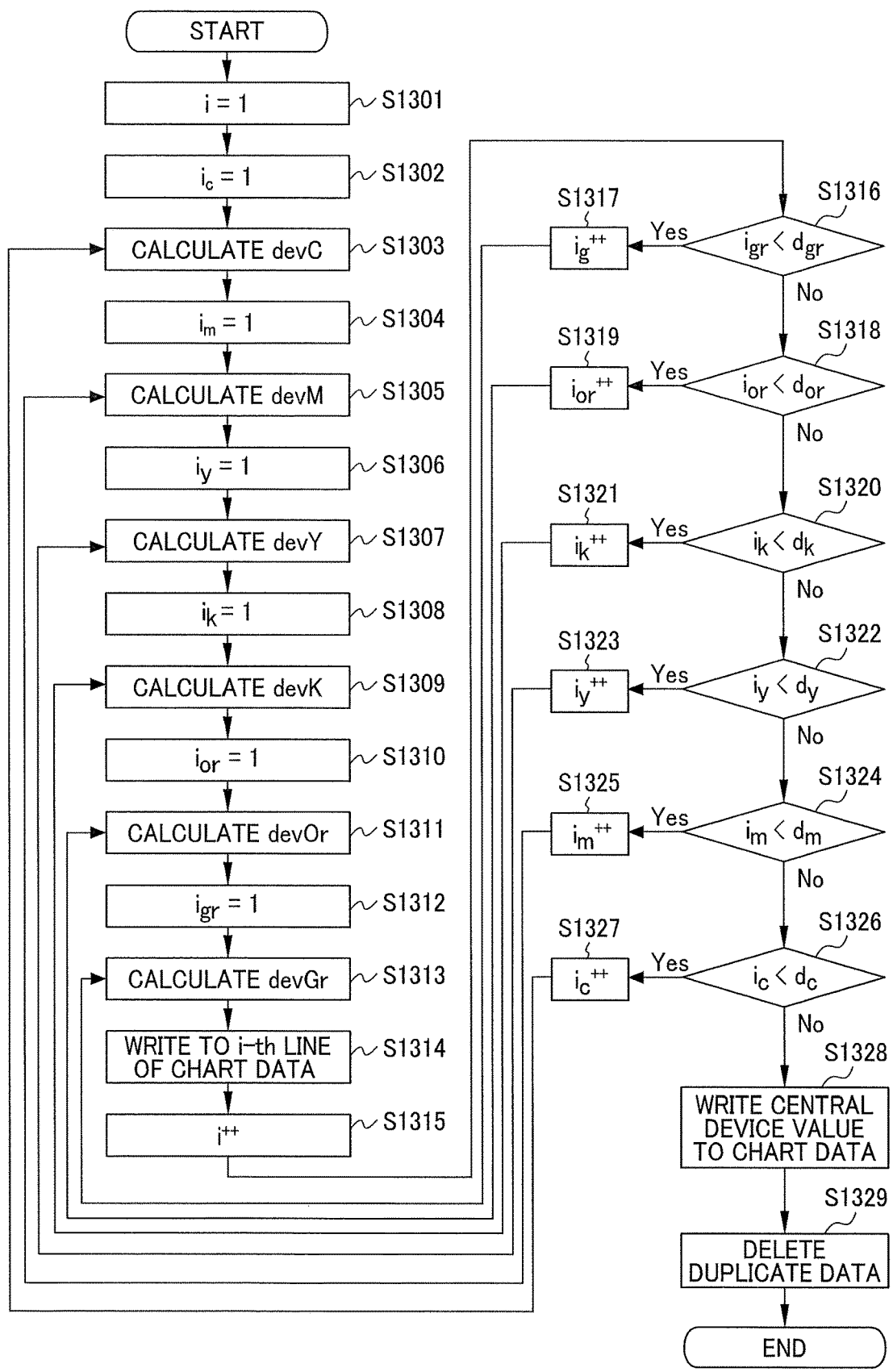
FIG. 13 is a flowchart illustrating an example of steps in a process of acquiring device values for a patch configuration, according to an embodiment of the present disclosure.

FIG. 13 is a flowchart illustrating a process of acquiring device values for a patch configuration according to an embodiment of the present disclosure. The device values for the patch configuration are acquired according to the flowchart of FIG. 13. The increment variables in FIG. 13 are as follows:

i=1=1,2, . . . Z (where Z=dc×dm×dy×dk×dor×dgr)
ic=1,2, . . . dc
im=1,2, . . . dm
iy=1,2, . . . dy
ik=1,2, . . . dk
ior=1,2, . . . dor
igr=1,2, . . . dgr Equation 2 is an equation for obtaining devC, which are gradation values of cyan.

$$devC = \begin{cases} C_0 & \text{if } d_c = 1 \\ (C_0 + w_c/2)(i_c - 1)/(d_c - 1) & \text{else if } C_0 - w_c/2 < 0 \\ C_0 - (w_c/2) + \{255 - C_0 - (w_c/2)\} \cdot \\ \quad (i_c - 1)/(d_c - 1) & \text{else if } 255 < C_0 + w_c/2 \\ C_0 - (w_c/2) + \{w_c \cdot (i_c - 1)/(d_c - 1)\} & \text{else} \end{cases}$$

where $$devC = \begin{cases} 0 & \text{if } d_c < 0 \\ 100 & \text{else if } 100 < d_c \end{cases}$$

For magenta, yellow, black, orange, and green, the parameters of the central device value, the number of divisions, and the gradation width in Equation 2 are replaced with those of each color in accordance with the representation in Table 3. According to the flowchart of FIG. 13, the device values (devC, devM, devY, devK, devOr, devGr) constituting the patch are determined, and the result is added to the chart data. When the device value needs to fall within an integer, the value obtained as above may be rounded off.

In a case where the number of divisions is as indicated in Table 2, according to the flowchart of FIG. 13, the number of patches per one adjustment target color is 5*4*3*2+1=121. The value 1 that is added last is a patch configured by the central device value. Data of the duplicate device values may be deleted. It is assumed that the size of the matrix after deleting duplicate data is X rows and 6 columns. That is, the number of patches is X. In addition, the patches are rearranged as needed. For example, in order to reduce the influence of in-plane variation, the arrangement of patches may be randomized in view of the number of print repetitions. In another example, the patches may be rearranged to facilitate visual evaluation. In any case, the number of patches and the device values of the patches are written in the chart data.

Figure 14:
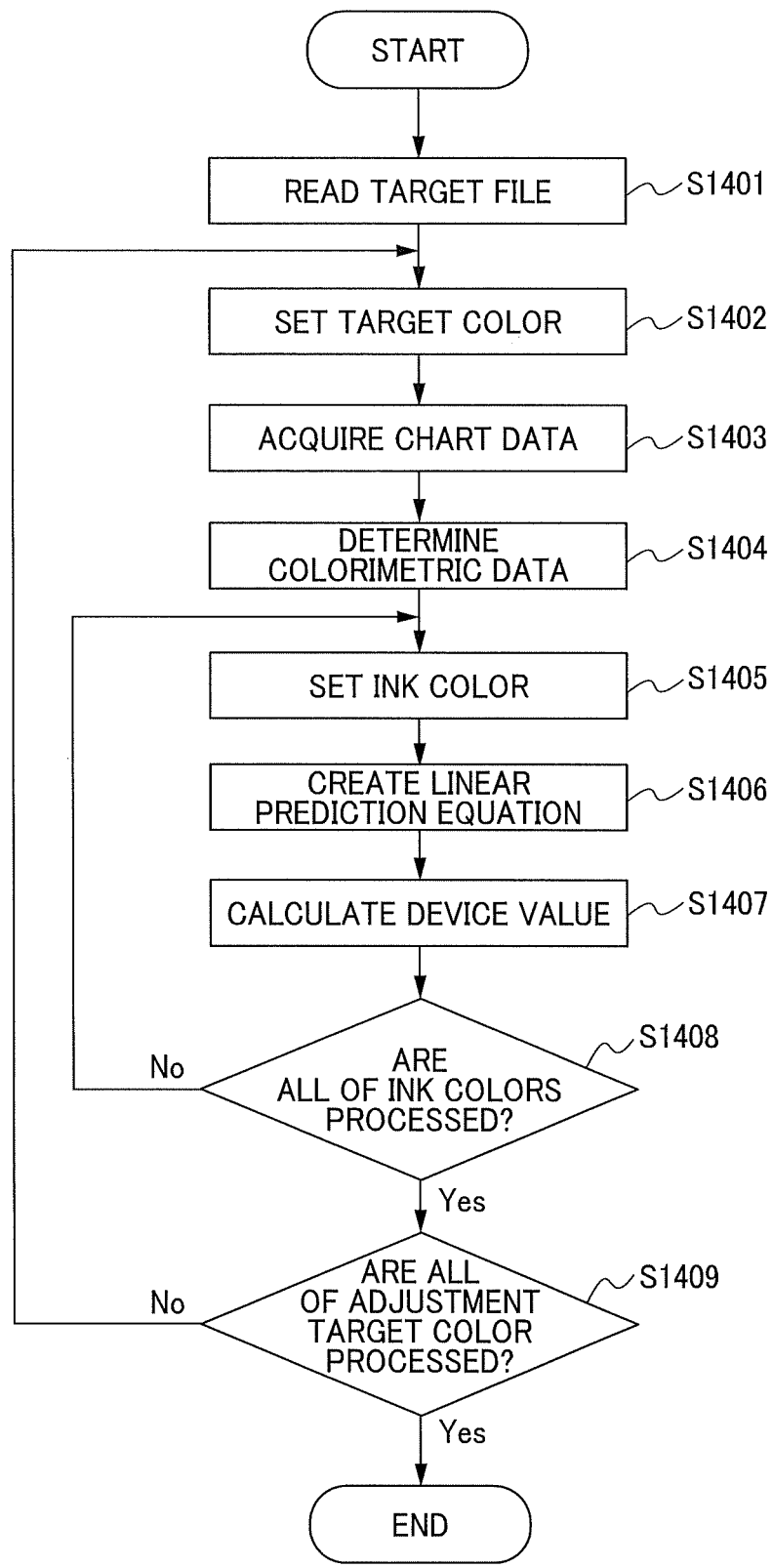
FIG. 14 is a flowchart illustrating an example of steps in a process of acquiring optimum device values for a patch configuration, according to an embodiment of the present disclosure.

Optimum Device Value Acquisition Process (S708):

A description is now given of the details of a process of obtaining the optimum device value according to the present embodiment, with reference to the flowchart of FIG. 14. First, the adjustment file generation unit 404 reads the target file from the storage unit 400 via the data input/output unit 401, and acquires the N rows and 4 columns of the color names and Lab values of adjustment target colors (S1401). The data is arranged in order of color name, L, a, b. Next, the adjustment file generation unit 404 selects one color from the adjustment target colors and sets the selected color to a target color (S1402). Next, the adjustment file generation unit 404 extracts (Z+1) rows of the patch configuration data corresponding to the target color from the chart data (S1403). In substantially the same manner, the adjustment file generation unit 404 extracts Z rows of the patch configuration data corresponding to the target color from the colorimetric data (S1404). Next, the adjustment file generation unit 404 sets an ink color to be processed (S1405), and creates a linear prediction equation for the set ink color (S1406). Next, the adjustment file generation unit 404 calculates a device value using the created linear prediction equation (S1407). The adjustment file generation unit 404 performs the steps S1401 to S1407 on all of the ink colors (S1405 to S1408). Further, the adjustment file generation unit 404 performs the steps from S1402 to S1408 on all of the adjustment target colors (S1409). Then, the process ends.

A description is now given of the details of each of steps S1402 to S1407.

Setting of Target Color (S1402):

Step S1402 is performed in the same or substantially the same manner as S903 of FIG. 9.

Acquisition of Corresponding Chart Data (S1403):

The adjustment file generation unit 404 extracts the patch configuration information corresponding to the target color that is set in the previous step from the chart data. Specifically, based on the information on the number of patches of the target color described in the chart data, the adjustment file generation unit 404 acquires the device values of the patches corresponding to the number of patches.

Acquisition of Corresponding Colorimetric Data (S1404):

The adjustment file generation unit 404 extracts information corresponding to the patches extracted in the previous step from the colorimetric data. That is, in S1403 and S1404, the adjustment file generation unit 404 acquires the device values of the patches of the target color and the corresponding colorimetric Lab values for the number of the patches.

Setting of Ink Color (S1405):

The adjustment file generation unit 404 sets a color to be processed from among C, M, Y, K, Or, and Gr.

Creation of Linear Prediction Equation (S1406):

The adjustment file generation unit 404 creates a linear prediction equation. Equation 3 indicates the linear prediction equation for cyan as an example. For example, $\alpha_c$, $\beta_c$, $\gamma_c$, and $\varepsilon_c$ on the right side of Equation 3 are determined by multiple regression analysis with the X-number of cyan device values as the objective variables and X-sets of Lab values as the explanatory variables. The adjustment file generation unit 404 creates the prediction equation for other ink colors other cyan in substantially the same manner.

$$f_c = \alpha_c \cdot L + \beta_c \cdot a + \gamma_c \cdot b + \varepsilon_c \qquad [\text{Equation 3}]$$

where $\alpha_c$, $\beta_c$, $\gamma_c$, $\varepsilon_c$ are determined by multiple regression analysis below:

$$\begin{bmatrix} C_1 \\ C_2 \\ \vdots \\ C_{X-1} \\ C_X \end{bmatrix} = [\alpha_C \ \beta_C \ \gamma_C \ \varepsilon_C] \cdot \begin{bmatrix} L_1 & L_2 & \cdots & L_{X-1} & L_X \\ a_1 & a_2 & \cdots & a_{X-1} & a_X \\ b_1 & b_2 & \cdots & b_{X-1} & b_X \\ 1 & 1 & \cdots & 1 & 1 \end{bmatrix}$$

Calculation of Device Value (S1407):

The adjustment file generation unit 404 inputs the target Lab value to L, a, and b on the right side of Equation E and inputs the result of the multiple regression analysis to $\alpha_c$, $\beta_c$, $\gamma_c$, and $\varepsilon_c$ on the right side of Equation 3, to calculates a device value (left side). Thus, the optimum device value for the target color is obtained.

According to the first embodiment described heretofore, since a gradation width suitable for each ink color is set by using the amount of change of the device value of each ink color in the colors close to the target color, the patches that are enough to ensure the accuracy of the linear prediction equation are generated, even if the number of the patches is small.

Although in the first embodiment, the optimum device value is automatically obtained after printing a chart image, the embodiment is not limited thereto. In another example, a user may select an optimal patch via the operation unit 300, and acquires a corresponding device value as an optimum device value.

In addition, although in the first embodiment, the initial device value (C0, M0, Y0, K0, Or0, Gr0) is set as the central device value, the embodiment is not limited thereto. For example, in a case where the above-described operation is repeatedly performed continuously, the output device value calculated in S1407 may be set to the central device value for the second and subsequent operations, instead of the initial device value. Setting the output device value calculated in S1407 to the central device value enables to perform adjustment while taking over the previous adjustment result.

Second Embodiment

In the second embodiment, a description is given of an example in which an ink color to be changed is selected in advance in accordance with the target color and other characteristics, in addition to the operation of the first embodiment. Specifically, a description is given of an example in which when in the process of determining the ink order in S904, ink colors having high ranks are determined using conditions other than the amount of change in the device value.

Figure 15:
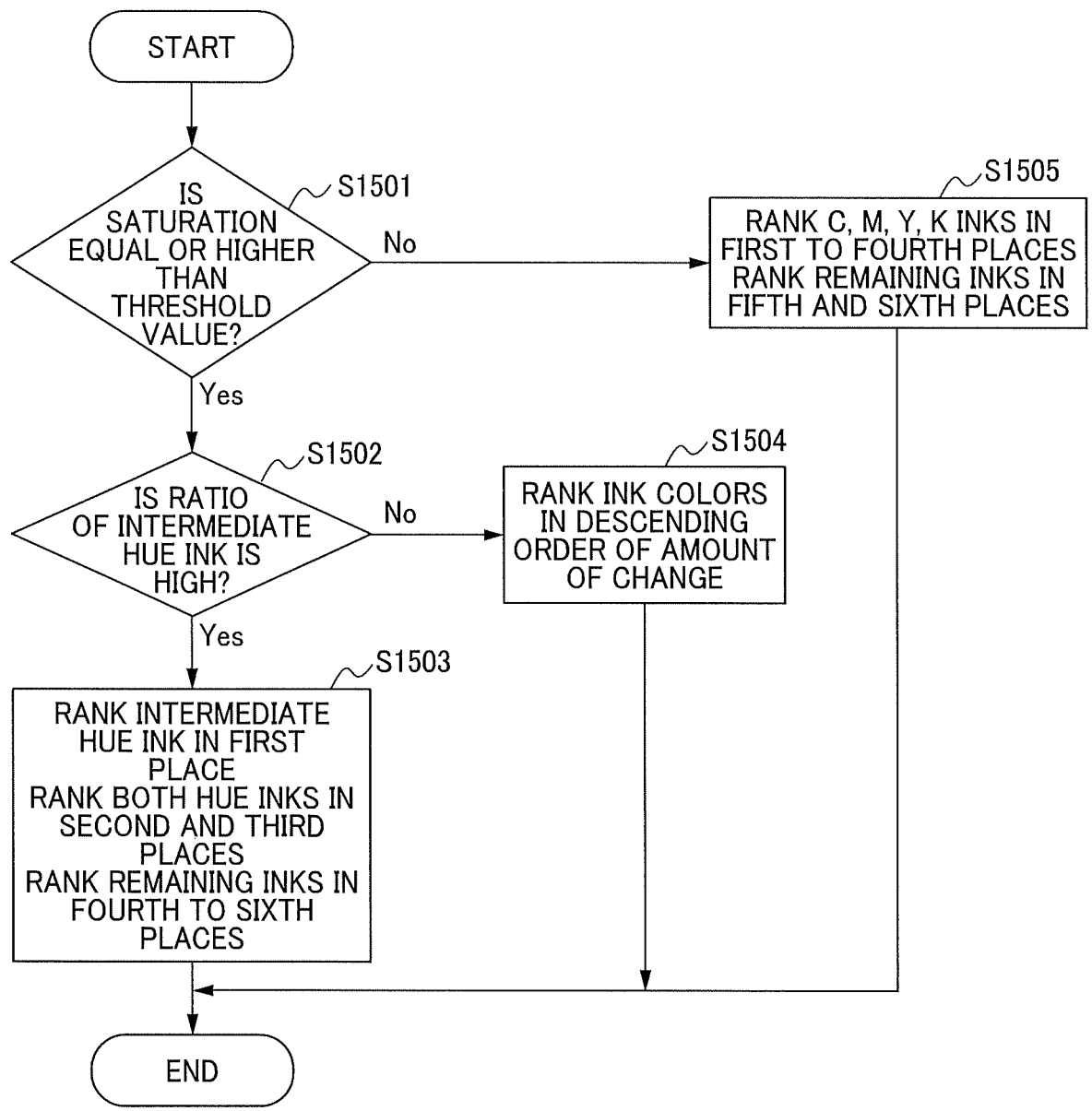
FIG. 15 is a flowchart illustrating an example of steps in a process, according to the second embodiment of the present disclosure.

FIG. 15 is a flowchart illustrating a process according to the second embodiment. In the process illustrated in the flowchart of FIG. 15, how to rank the ink colors is changed according to the characteristics of the target color and the ink configuration. First, the adjustment file generation unit 404 determines a saturation of the target color (S1501). When the saturation is equal to or higher than a threshold value, the process proceeds to the next step (S1502). In step S1502, the adjustment file generation unit 404 determines whether the ratio of the intermediate hue ink is high.

Intermediate Ink Ratio Determination:

Condition 1: In the ink order determination process described in the first embodiment, the intermediate hue ink (Or or Gr) is identified as an ink color having the largest amount of change in the device value (i.e., the intermediate ink is ranked in the first place in the ink order).

Condition 2: The initial device value of the intermediate hue ink is equal to or more than a threshold value (%).

When both of the above Condition 1 and Condition 2 are satisfied, the adjustment file generation unit 404 determines that the ratio of the intermediate hue ink is high.

When the adjustment file generation unit 404 determines that the ratio of the intermediate hue ink is high in step S1502, the process proceeds to step S1503. In step S1503, the adjustment file generation unit 404 ranks the identified intermediate hue ink (Or or Gr) in the first place. Further, in step S1504, the adjustment file generation unit 404 ranks one of inks of two hues that are adjacent to the both sides of the intermediate hue ink that is ranked in the first place in the second place, and ranks the other one of inks of the two hues in the third place. Specifically, the adjustment file generation unit 404 ranks the one of inks of the two hues having the larger amount of change than the other one of inks of the two hues in the second place. In other words, the adjustment file generation unit 404 ranks the one of inks of the two hues having the smaller amount of change than the other one of inks of the two hues in the third place. For example, when the intermediate hue ink that is ranked in the first place is Or, one of the inks of M and Y that has a larger amount of change than the other is ranked in the second place, and the other one is ranked in the third place. Similarly, when the intermediate hue ink that is ranked in the first place is Gr, one of the inks of Y and C that has a larger amount of change than the other is ranked in the second place, and the other one is ranked in the third place. The adjustment file generation unit 404 ranks the remaining inks in the fourth to sixth places in descending order of the amount of change (S1503). This ink order setting aims to forcibly adding the ink colors that are adjacent to the both sides of the ink of the intermediate hue, to prevent the adjustment from not reaching the target color, when the saturation of the target color is greater than or equal to the threshold value and the ratio of the intermediate hue ink is high (because the saturation of the target color may not be achieved even when 100% of the intermediate hue ink is used.)

By contrast, when the adjustment file generation unit 404 determines that the ratio of the intermediate hue ink is not high in the process of determining intermediate hue ink (S1502), the adjustment file generation unit 404 ranks the ink colors in descending order of the amount of change of the device value as described in the first embodiment (S1504).

When in the saturation determination in S1501, the adjustment file generation unit 404 determines that the saturation of the target color is less than the threshold value and therefore the target color is a color close to an achromatic color, the adjustment file generation unit 404 ranks the C, M, Y and K inks in the first to fourth places in descending order of the amount of change, and ranks the Or and Gr inks in the fifth and sixth places in the descending order of the change amount (S1505). This ink order setting aims to perform adjustment without using the intermediate hue inks as adjustment targets when the target color is a color close to an achromatic color.

Thus, the ink order determination process according to the second embodiment ends.

As described heretofore, the processing speed is enhanced by determining inks to be ranked in higher places in the ink order in advance in consideration of other conditions than the amount of change in the device value.

Third Embodiment

In the third embodiment, a description is given of an example in which the processing of the first embodiment is partially changed, specifically the gradation width is extended in a particular case. More specifically, a description is given of an example in which the gradation width is extended in the setting of the gradation width in S905 when there is a deviation from the target color or a characteristic of the ink configuration.

In this example, in substantially the same manner as the first embodiment, the larger the change amount of the device value is, the larger the gradation width is set. In addition, in the present embodiment, a set of a normal gradation width and a set of an extended gradation width are provided, and one of the two sets is set according to the color difference between the initial Lab value and the target color and the characteristics of the ink configuration. The set of the normal gradation width is the example indicated in Table 1, and an example of the set of extended gradation width is indicated in Table 4.

TABLE 4

| Ink Order | 1 | 2 | 3 | 4 | 5 | 6 |
|---|---|---|---|---|---|---|
| Gradation Width (Extended) | 30 | 27 | 15 | 7.5 | 0 | 0 |

Figure 16:
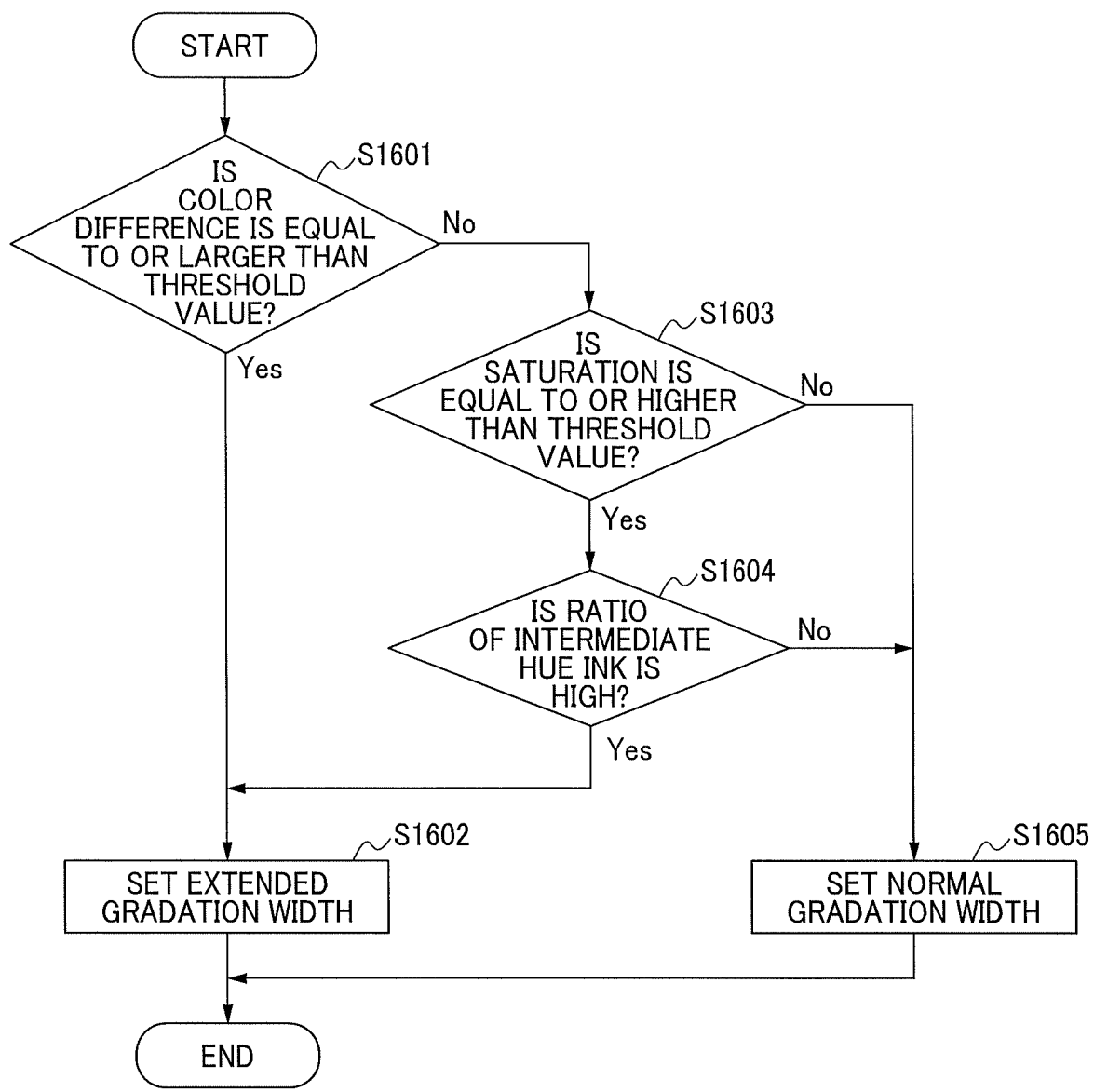
FIG. 16 is a flowchart illustrating an example of steps in a process, according to the third embodiment of the present disclosure.

FIG. 16 is a flowchart illustrating a process according to the third embodiment. First, the adjustment file generation unit 404 determines a color difference between the target Lab value and the initial Lab value based on the CIE1976 Lab color difference (S1601). When the color difference is equal to or larger than the threshold (color difference 3), the adjustment file generation unit 404 sets the extended gradation width (S1602). This setting aims to prevent adjustment from not reaching the target color reproduction. By contrast, when the color difference is less than the threshold value (color difference), the adjustment file generation unit 404 performs saturation determination (S1603). The saturation is determined in the same or substantially the same manner as S1501 of the second embodiment.

When the result of the saturation determination indicates that the saturation is equal to or greater than the threshold value (saturation value), the adjustment file generation unit 404 determines whether the ratio of the intermediate hue ink high (S1604). The ratio of the intermediate hue ink is determined in the same or substantially the same manner as S1502 of the second embodiment.

When the adjustment file generation unit 404 determines that the ratio of the intermediate hue ink is high, the adjustment file generation unit 404 sets the extended gradation width (S1602). Although the color determined in this manner is a color close to the gamut, it is considered that the initial device value of the intermediate hue ink is already high, and there is little room for adjusting the gradation value in the intermediate hue ink. Since the adjustment is to be performed on the ink colors that are ranked in the second and third places in practice, the gradation width needs to be set to a large extent.

By contrast, when the adjustment file generation unit 404 determines that the ratio of the intermediate hue ink is not high, the adjustment file generation unit 404 sets the normal gradation width (S1605). Further, when the adjustment file generation unit 404 determines that the saturation less than the threshold value (saturation) in the saturation determination (S1603), the adjustment file generation unit 404 sets the normal gradation width (S1605).

Thus, the gradation width setting process according to the third embodiment ends.

As described heretofore, patches sufficient for ensuring the accuracy of the linear prediction equation by varying the gradation width set depending on the divergence from the target color and the characteristics of the ink configuration.

Figure 17:
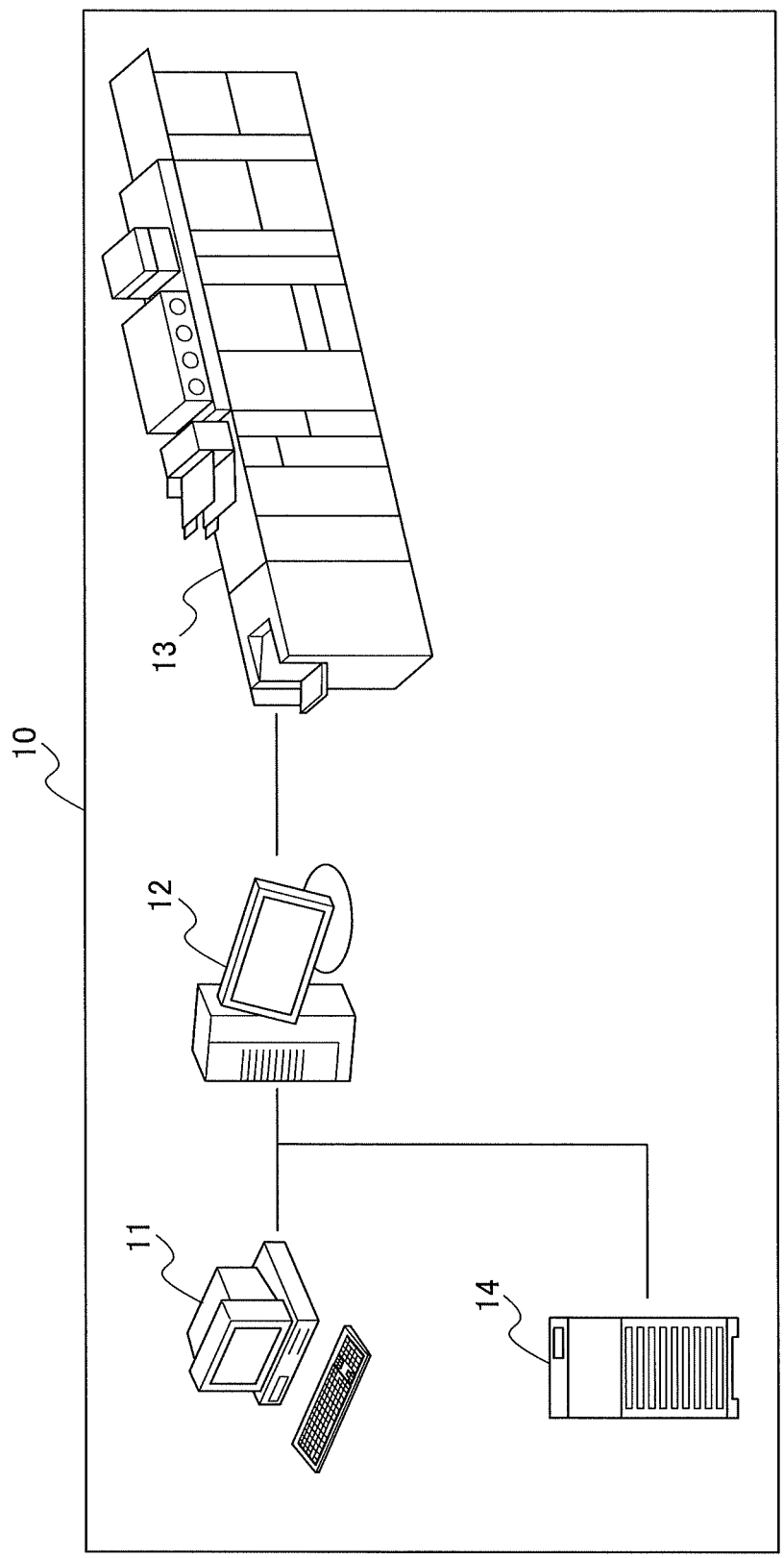
FIG. 17 is a schematic view illustrating an example of a system configuration, according to an embodiment of the present disclosure.

FIG. 17 is a schematic view illustrating an example of a system configuration according to an embodiment of the present disclosure. A system 10 includes a client personal computer (PC) 11, a digital front end (DFE) 12, an image forming apparatus 13, and a management server 14.

The client PC 11 creates a printing job in accordance with a user's operation for printing, and transmits the printing job to the DFE 12 or the management server 14. The client PC 11 includes a display device implemented by, for example, a liquid crystal display, and an input device such as a mouse and a keyboard.

The DFE 12 is an example of an information processing apparatus. The DFE 12 receives the printing job from the client PC 11 or the management server 14, creates drawing data with a raster image processor (RIP) engine based on the received print job, and transmits the drawing data to the image forming apparatus 13. Note that image forming apparatus 13 may include the functions of the information processing apparatus.

The image forming apparatus 13 forms an image based on the drawing data received from the DFE 12.

The management server 14 manages the printing job received from the client PC 11. Further, the management server 14 transmits the printing job to the DFE 12 in response to a request from the DFE 12.

Figure 18:
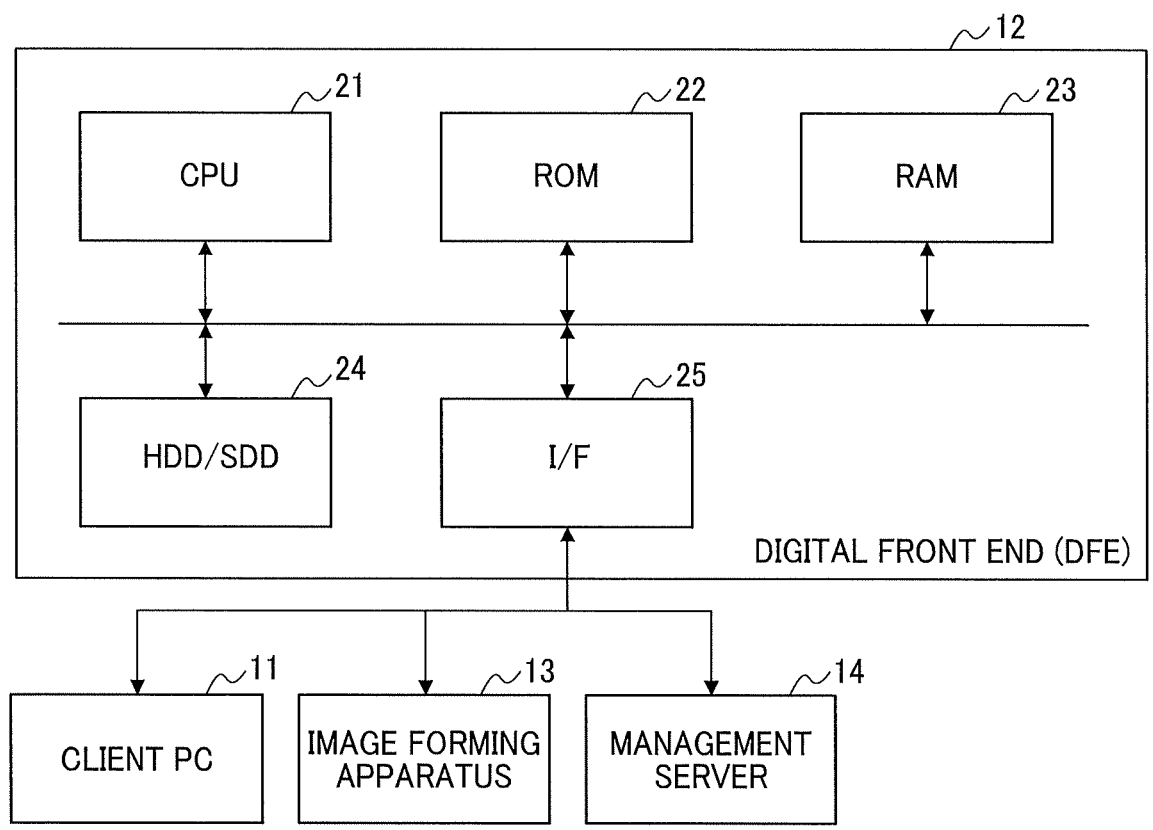
FIG. 18 is a block diagram illustrating an example of a hardware configuration, according to an embodiment of the present disclosure.

FIG. 18 is a block diagram illustrating an example of a hardware configuration according to an embodiment of the present disclosure. The DFE 12, which is an example of an information processing apparatus, includes a central processing unit (CPU) 21, a read only memory (ROM) 22, a random access memory (RAM) 23, a hard disc drive (HDD)/solid state drive (SSD) 24, and an interface (I/F) 25.

The CPU 21 uses the RAM 23 as a work area to execute a program stored in the ROM 22.

The HDD/SSD 24 is used as a storage device configured to store preset values. The information stored in the HDD/SSD 204 may be used by the CPU 21 when executing the read program.

The I/F 25 is an interface that communicably connects the DFE 12 to the client PC 11, the image forming apparatus 13, and the management server 14.

The present disclosure is not limited to adjustment of a spot color reproduced by an inkjet image forming apparatus, but may applicable to adjustment of a spot color reproduced by an electrophotographic image forming apparatus.

According to one or more embodiments of the present disclosure, when a patch configuration is determined by changing device values, the number of patches is prevented from increase regardless of the number of inks used in a printer.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. An information processing apparatus comprising circuitry configured to:
   receive designation of a particular color;
   obtain device values of a plurality of colors that are present within a predetermined distance or less from the designated particular color in a color space; and
   determine a patch configuration based on the device values,
   wherein in determination the patch configuration, the circuitry is configured to determine a gradation change width of each color material based on a degree of change of a device value of each color material.

2. The information processing apparatus of claim 1, wherein
in determining the patch configuration, the circuitry is configured to set the gradation change width of a color material whose degree of change of the device value is smaller than a threshold value to zero.

3. The information processing apparatus of claim 1, wherein
in determining the patch configuration, the circuitry is configured to set a value of the gradation change width to a greater value in descending order of the degree of change of the device value for each color material.

4. The information processing apparatus of claim 3, wherein
the larger the gradation change width set by the circuitry is, the larger the number of gradation divisions is set.

5. The information processing apparatus of claim 1,
in determining the patch configuration, the larger a color difference between the designated particular color and a target color is, the larger the gradation change width is set.

6. The information processing apparatus of claim 1, wherein
the circuitry is further configured to obtain the device values using a profile.

7. An information processing apparatus comprising circuitry configured to:
receive designation of a particular color;
obtain device values of a plurality of colors that are present within a predetermined distance or less from the designated particular color in a color space; and
determine a patch configuration based on the device values, wherein in determination the patch configuration, the circuitry is further configured to determine a change target color material, of which gradation is to be changed, based on a degree of change of a device value of each color material.

8. The information processing apparatus of claim 7, wherein
when a saturation of the designated particular color is equal to or less than a threshold value, the circuitry is further configured to exclude intermediate hue color material from the change target color material.

9. The information processing apparatus of claim 7, wherein
when the designated particular color is a color close to a gamut and a usage ratio of a color material of an intermediate hue in the device values is equal to or greater than a threshold value, the circuitry is further configured to set color materials of hues adjacent to both sides of the intermediate hue to the change target color material.

10. A method performed by an information processing apparatus, the method comprising:
receiving designation of a particular color;
obtaining device values of a plurality of colors that are present within a predetermined distance or less from the designated particular color in a color space; and
determining a patch configuration based on the device values,
wherein the determining the patch configuration includes determining a gradation change width of each color material based on a degree of change of a device value of each color material.

* * * * *